US006156964A

United States Patent [19]

Sahai et al.

[11] Patent Number: 6,156,964

[45] Date of Patent: Dec. 5, 2000

[54] APPARATUS AND METHOD OF DISPLAYING MUSIC

[76] Inventors: Anil Sahai, 709 White Post Dr., Webster City, Iowa 50595; Arun Somani, 2245 Ridgetop Cir., Ames, Iowa 50014-4552

[21] Appl. No.: 09/325,088

[22] Filed: Jun. 3, 1999

[51] Int. Cl.[7] .................................................... G09B 15/00

[52] U.S. Cl. .................... 84/470 R; 84/477 R; 84/483.1

[58] Field of Search ............................ 84/470 R, 477 R, 84/483.1

[56] References Cited

U.S. PATENT DOCUMENTS 4,976,182 12/1990 Obuchi et al. ........................ 84/470 R
5,315,911 5/1994 Ochi et al. ............................ 84/477 R
5,521,323 5/1996 Paulson et al. .......................... 84/610
5,521,324 5/1996 Dannenberg et al. .................... 84/612
5,693,903 12/1997 Heidorn et al. .
5,760,323 6/1998 Romero et al. ....................... 84/470 R
5,952,597 9/1999 Weinstock et al. .................. 84/477 R

*Primary Examiner*—Jeffrey Donels
*Attorney, Agent, or Firm*—Zarley, McKee, Thomte, Voorhees & Sease

[57] ABSTRACT

A music score display device that eliminates the need for hard copy sheet music and manually turning pages or advancing the music score. The music score display device includes a storage device for storing music score data, a display device for displaying the music score, an input device for inputting music playing data from the musician, a microprocessor, and a computer program. The computer program compares the music score data with the music playing data to determine the playing position of the musician. The computer program then controls the display device so that it displays the portion of the music score corresponding to the playing position of the musician.

12 Claims, 2 Drawing Sheets

APPARATUS AND METHOD OF DISPLAYING MUSIC

BACKGROUND OF THE INVENTION

Most musicians practice or perform songs from sheet music or music books. However, a problem associated with sheet music and books is that they must be placed in front of the musician such that he or she can see the music while playing the instrument. This usually requires the use of a separate music stand on which to mount the music. These stands are often not stable and can wobble or fall over while the musician is playing, causing disruption of the play of music.

Further, the musician's composition often cannot be displayed all on one or two pages. Therefore, the musician himself must turn the pages of the music while playing, or have someone else turn the pages. However, it is usually very difficult for the musician to turn the pages and play the instrument at the same time without interrupting the flow of the song.

Furthermore, the paper on which music is typically printed wears out quickly with frequent use. Once the pages of the music become frayed or torn, the music becomes difficult to read. The musician must therefore discard or replace the music if he wants to continue playing it. Since the music is quite expensive to purchase, the process of replacing the music as it becomes worn out becomes even more expensive.

There is therefore a need in the art for a means for musicians to play written music that is not associated with the aforementioned problems.

It is a primary objective of the present invention to provide a method and means of allowing musicians to play written music that does not require the musician to cease play to turn pages.

It is a further objection of the present invention to provide a method and means of allowing musicians to play written music that does not involve the use of conventional music stands.

It is still a further objective of the present invention to provide a method and means of allowing musicians to play written music that is not printed on paper that wears out quickly and is expensive to replace.

These and other objectives will become clear from the following detailed description of the invention.

SUMMARY OF THE INVENTION

The present invention includes a music score display device that obviates the need for a musician to manually turn the pages of a written music score. The music score display device includes a storage device for storing music score data, a display device for displaying the music score, an input device for inputting music playing data from the musician, a microprocessor, and a computer program. The computer program compares the music score data with the music playing data to determine the playing position of the musician. The computer program then controls the display device so that it displays the portion of the music score corresponding to the playing position of the musician. Once the musician reaches the end of the displayed portion of the music score, the display changes as if the musician turned the page. In its preferred form, the computer program samples the music playing data and compares the tone frequencies of the sample with the tone frequency data patterns from different sections of the music score.

The present invention also includes a method of displaying a music score that eliminates the need for hard copy sheet music and manually turning pages or advancing the score. The music to be played is stored in digital format. An audio music signal from the musician is sensed and converted into a digital format. The music score data is then compared with music playing data from the musician to determine the musician's playing position. Once the playing position is determined, a display device displays the corresponding portion of the music score in graphical form.

DETAILED DESCRIPTION OF TIE PREFERRED EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1:
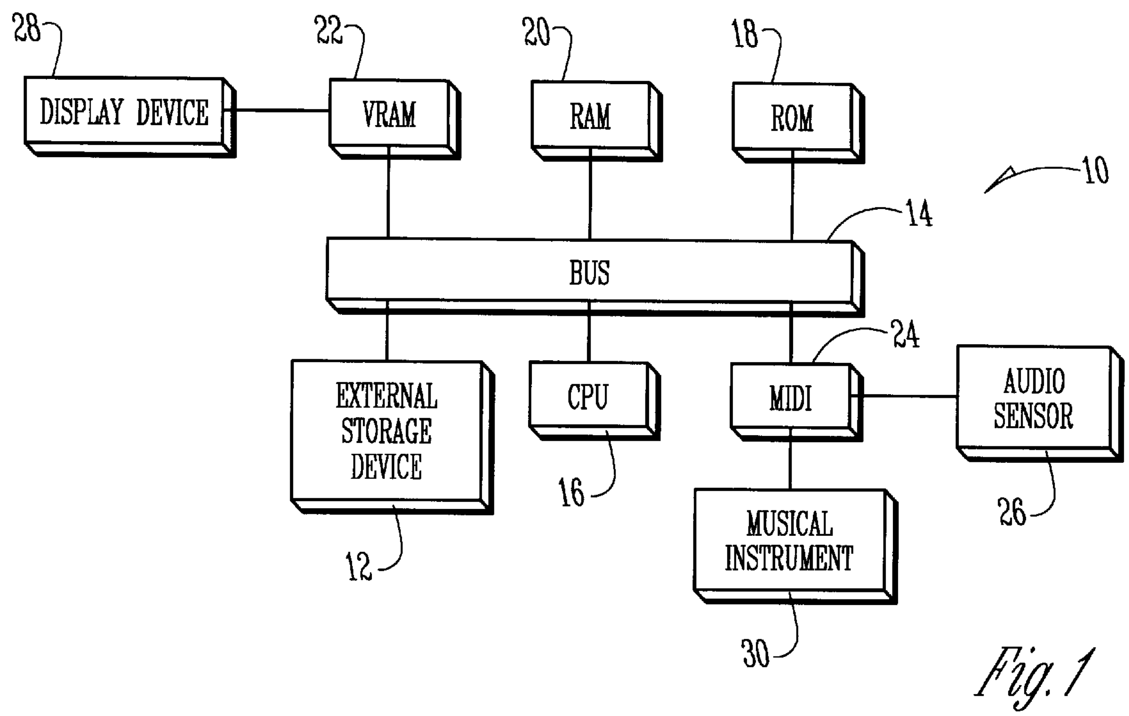
FIG. 1 is a block diagram of a music score display device of the present invention.

Now referring to the drawings, FIG. 1 shows the music score display device 10 of the present invention in block form. The music score data is stored in an external storage device 12. The external storage device can take the form of a hard drive, compact disc, floppy disc or other digital storage medium. The music score data contains tone frequency data, duration data, and timing data for each note. Tempo and dynamic data may also be included (e.g., staccato mark, forte mark). The music score display device may be operatively connected to a computer network, such as a Local Area Network (LAN) or the Internet, to download music scores in digital format to the external storage device 12.

The external storage device 12 is connected to a bus 14. Also connected to the bus 14 are a CPU 16 for controlling the process of the music score display device 10, a ROM 18, a RAM 20, a VRAM 22, and a Musical Instrument Digital Interface (MIDI) 24. An audio sensor 26, such as an air microphone, is operatively connected to the MIDI interface 24. Data stored in the VRAM 22 is displayed on the display device 28, such as an LCD display or CRT. A computer program for controlling the music score display device is stored in the ROM 18. It can be appreciated from this description that the present invention can be used with a notebook, desktop or other personal computer.

The computer program is capable of determining and following the musician's playing position on the musical score. The VRAM 22 stores graphics data of the music score data for a specified section of the music score that includes the playing position of the musician. The graphics data stored in the VRAM 22 is displayed in a graphical form on the display device 28.

The display device 28 is positioned in front of the musician with the audio sensor 26 near the musician. It is required that the audio music signal from the musician be converted into digital format. This can be accomplished through use of either an audio sensor 26 fed into a digital data converter, such as the MIDI interface 24, or with the musical instrument 30 connected directly to the MIDI interface.

Figure 2:
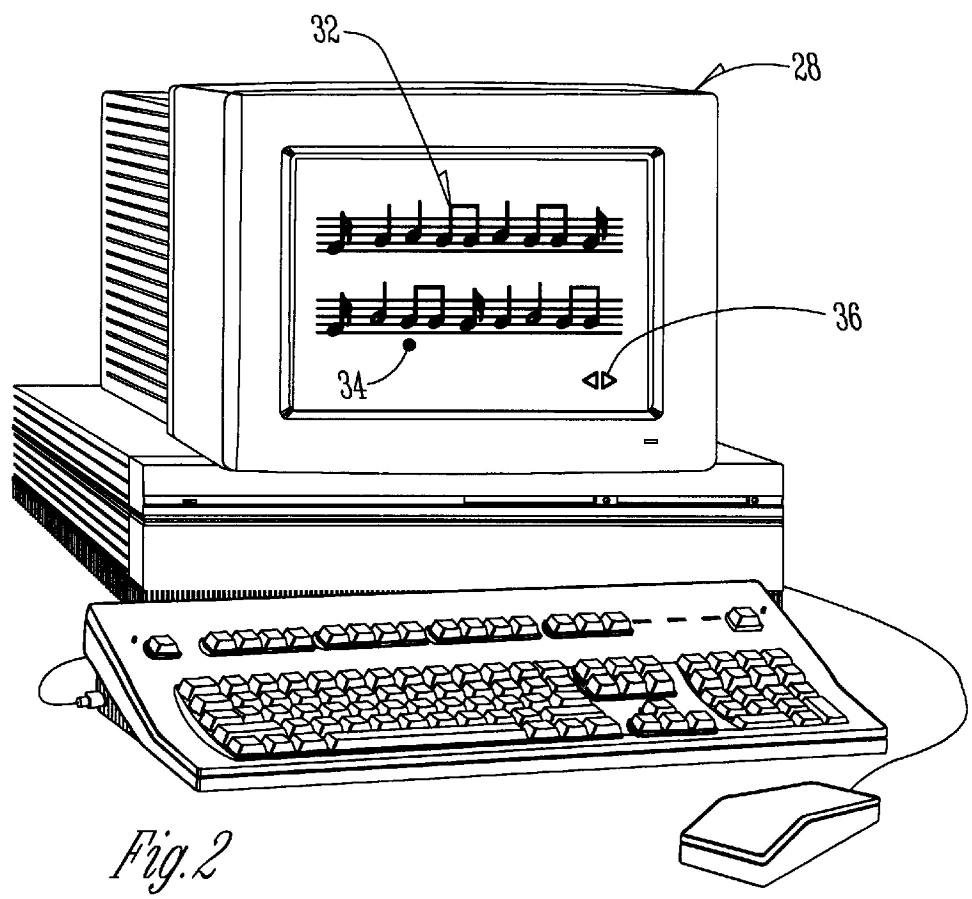
FIG. 2 is a pictorial view of an example of a music score displayed on a display device.

FIG. 2 shows an example of a music score 32 displayed on the display device 28. The display device 28 can display one page of score. When playing of the page is completed, the next page of the score is displayed. FIG. 2 shows an indicator mark or highlight 34 around the notes of the score that musician is currently playing. The computer program controls the indicator mark to follow the music as it is performed by the musician.

The display device 28 preferably includes a touch screen interface capable of receiving inputs from the musician by the musician simply touching certain parts of the screen. As shown in FIG. 2, arrows 36 appear on the bottom of the screen that when touched override the normal operation of the music score display device 10 and turn the pages of the score. A foot pedal or other mechanical device (not shown) may also be provided and interfaced with the music score display device 10 to override the normal operation of the device and turn the pages of the score.

Figure 3:
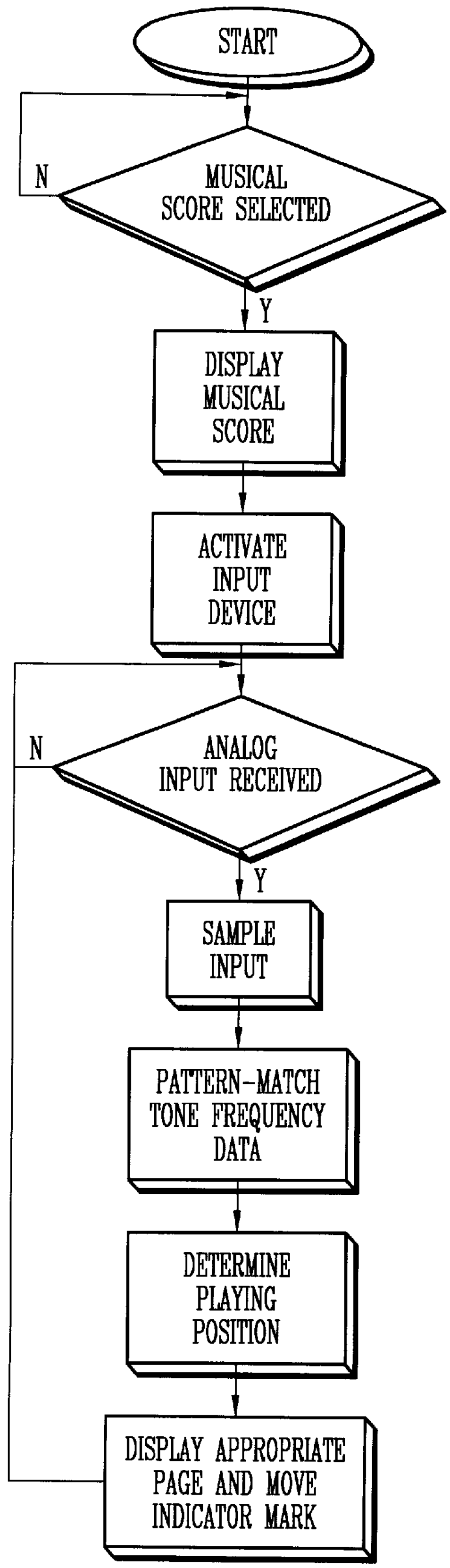
FIG. 3 is a flowchart showing the process of the music score display device.

The flowchart in FIG. 3 shows the process controlled by the computer program to enable the music score display device 10 to display the appropriate page of the score and follow the musician. The process begins by the musician selecting a particular music score. The first page of that music score is then displayed on the display device 28. The input device, including the audio sensor 26, is then activated to sense a music sound signal from the musician. The analog signal sampled covers the spectrum of interest, up through approximately 10 KHz. A Fourier transfer (discrete) analysis is employed to analyze the frequency spectrum. This analog signal is converted into music playing data that is stored in a buffer in the RAM 20.

The computer program samples the music playing data and compares it against patterns of the music score data to determine the playing position of the musician. In specific, both the music score data and music playing data have tone frequency data that is composed. A model-based pattern matching scheme is employed to make the comparison of the tone frequency data and determine the playing position. Preferably, approximately five notes of music playing data are compared with the music score data to determine the playing position.

Once the computer program determines the playing position of the musician, the graphics data corresponding to the appropriate page of the musical score is sent to the VRAM 22 for display on the display device. Also, the indicator or highlight 34 is set to indicate the notes in the score where the musician is playing.

The process described above occurs in real time with the computer program continually monitoring and controlling the display device.

From the foregoing, it can be seen that the present invention accomplishes at least all of its stated objectives.

What is claimed is:

1. A music score display device having the advantage of detecting and displaying a portion of a music score being played by a musician, the music score display device comprising:

- a storage device for storing music score data;
- a display device for displaying at least a portion of the music score data;
- an input device for sampling, converting into digital form, and inputting music playing data from the musician;
- a microprocessor operatively connected to the storage device, the display device, and the input device; and
- a computer program interfacing with the microprocessor for comparing the music score data with the music playing data to determine a playing position of the musician and displaying on the display device at least a portion of the music score corresponding to the playing position and further displaying the playing position of the musician in real time as music is being played.

2. The music score display device of claim 1 wherein the input device includes an audio sensor for receiving an analog sound signal, the audio sensor being operatively connected to a digital sound data converter.

3. The music score display device of claim 1 wherein the input device includes a MIDI interface with the microprocessor.

4. The music score display device of claim 1 wherein the display device includes a touch screen and the computer program controls the display of the music score in response an input from the musician via the touch screen.

5. The music score display device of claim 1 wherein the computer program controls an indicator mark on the display device that identifies notes on the music score being played by the musician.

6. The music score display device of claim 1 wherein the music score data includes tone frequency data and the music playing data includes tone frequency data, the computer program compares the tone frequency data of the music score data with the tone frequency data of the music playing data to determine the playing position.

7. The music score display device of claim 6 wherein the computer program samples a portion of the tone frequency data of the music playing data and compares it with tone frequency data patterns in the music score data to determine the playing position.

8. The music score display device of claim 1 wherein the storage device is operatively connected to a computer network having stored music score data so that the music score display device can download music score data from the computer network.

9. A music score display system comprising:

- a music score display device including a storage device for storing music score data, a display device for displaying at least a portion of the music score data, an input device for inputting music playing data from a musician, a microprocessor, and a computer program interfacing with the microprocessor for comparing the music score data with the music playing data to determine a playing position of the musician and displaying on the display device at least a portion of the music score corresponding to the playing position and further displaying on the display device the playing position of the musician;
- a musical instrument; and
- a MIDI interface operatively connecting the musical instrument with the music score display device.

10. The music score display system of claim 9 wherein the music score display device is operatively connected with a computer network having stored music score data so that the music score display device can download music score data from the computer network.

11. A method of displaying a music score comprising the steps of:

- providing a music score display device including a storage device for storing music score data, a display device for displaying at least a portion of the music score data, an input device for inputting music playing data from a musician, a microprocessor, and a computer program interfacing with the microprocessor for comparing the music score data with the music playing data;

storing music score data on the storage device;

sensing an audio music playing signal from the musician;

converting the audio music signal into music playing data;

comparing the music score data with the music playing data;

determining a playing position of the musician on the music score data;

displaying on the display device a portion of the music score data corresponding to the playing position; and displaying on the display device an indicator of the playing position of the musician.

12. The method of claim 11 further comprising the steps of:

providing a computer network having stored music score data; and downloading the music score data from the computer network to the storage device of the music score display device.

* * * * *